(12) United States Patent
Tanaka et al.

(10) Patent No.: US 9,809,433 B2
(45) Date of Patent: Nov. 7, 2017

(54) STACKER CRANE

(71) Applicant: MURATA MACHINERY, LTD., Kyoto-shi, Kyoto (JP)

(72) Inventors: Hiroshi Tanaka, Inuyama (JP); Yumiko Komada, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 125 days.

(21) Appl. No.: 14/891,145

(22) PCT Filed: Mar. 7, 2014

(86) PCT No.: PCT/JP2014/001307
§ 371 (c)(1),
(2) Date: Nov. 13, 2015

(87) PCT Pub. No.: WO2014/184990
PCT Pub. Date: Nov. 20, 2014

(65) Prior Publication Data
US 2016/0096711 A1  Apr. 7, 2016

(30) Foreign Application Priority Data
May 16, 2013  (JP) .................................. 2013-104559

(51) Int. Cl.
*B66F 9/07* (2006.01)
*B65G 1/04* (2006.01)

(52) U.S. Cl.
CPC ................ *B66F 9/072* (2013.01); *B65G 1/04* (2013.01); *B65G 1/0407* (2013.01); *B66F 9/07* (2013.01)

(58) Field of Classification Search
CPC .......... B66F 9/07; B66F 9/072; B65G 1/0407; B65G 1/04
See application file for complete search history.

(56) References Cited

U.S. PATENT DOCUMENTS

| | | | | |
|---|---|---|---|---|
| 5,433,292 A | * | 7/1995 | Haymore .................. | B66B 5/18 187/235 |
| 5,815,085 A | * | 9/1998 | Schneider ................. | B66F 9/07 340/3.31 |
| 6,105,727 A | * | 8/2000 | Nakao ....................... | B66F 9/07 187/250 |

FOREIGN PATENT DOCUMENTS

| | | |
|---|---|---|
| JP | 4-91906 U | 8/1992 |
| JP | 2008-74542 A | 4/2008 |
| JP | 2008-114969 A | 5/2008 |

OTHER PUBLICATIONS

Official Communication issued in International Patent Application No. PCT/JP2014/001307, dated Jun. 3, 2014.

(Continued)

*Primary Examiner* — Glenn Myers
(74) *Attorney, Agent, or Firm* — Keating & Bennett, LLP

(57) ABSTRACT

A stacker crane includes a first covering body covering a sliding section of a mast and an ascending and descending unit, and providing a first space extending vertically along the mast, a second covering body providing a second space extending vertically along the mast and partitioned from the first space by a first barrier, a plurality of exhaust holes that are vertically dispersed in the first barrier and cause the first space and the second space to be in communication, and an exhaust device that is attached to the mast and expels air in the second space at a portion in a vertical direction.

6 Claims, 6 Drawing Sheets

(56) References Cited

OTHER PUBLICATIONS

English translation of Official Communication issued in corresponding International Application PCT/JP2014/001307, dated Nov. 26, 2015.

* cited by examiner

STACKER CRANE

BACKGROUND OF THE INVENTION

1. Field of the Invention

The present invention relates to stacker cranes that travels along shelves storing loads and transfer loads between shelves.

2. Description of the Related Art

In, for example, industrial establishments that handle a large number of loads, loads are stored vertically and horizontally on shelves, and placing and removal of the loads is automated using a stacker crane that moves along the shelves.

With stacker cranes used in clean rooms, it is difficult to reduce the amount of dust generated at the sliding section because the sliding section is large, so sometimes implementations to remove the dust generated at the sliding section are devised.

For example, Japanese Unexamined Patent Application Publication No. 2008-74542 discloses a technique for capturing dust in a stacker crane having a long mast designed for tall, vertically stacked shelves and a covered area behind the mast where a chain for driving the ascending and descending unit rotates. The dust generated throughout the entire mast is captured by drawing in the air in the covered area with a plurality of fan filter units installed in top and bottom ends of the covered area.

However, with the sort of conventional technique disclosed in Japanese Unexamined Patent Application Publication No. 2008-74542, the longer the overall length of the mast is, the greater number of fan filter units are required to be attached to the mast, thus increasing the weight of the stacker crane, which necessitates more power to operate the stacker crane.

SUMMARY OF THE INVENTION

Preferred embodiments of the present invention provide a stacker crane that efficiently captures dust generated from a mast of a stacker crane, throughout an entire area of the mast, and significantly reduces or prevents spreading of dust inside a clean room.

A stacker crane according to a preferred embodiment of the present invention includes a travel unit that moves along a shelf that stores a load, a transfer unit that transfers the load to the shelf, a mast extending vertically and attached to the travel unit, and an ascending and descending unit that slides along the mast and moves the transfer unit vertically. The stacker crane includes a first covering body covering a sliding section of the mast and the ascending and descending unit, and defining a first space extending vertically along the mast; a second covering body defining a second space extending vertically along the mast, the second space being partitioned from the first space by a first barrier; a plurality of exhaust holes that are vertically dispersed in the first barrier to cause the first space and the second space to be in communication; and an exhaust device that is attached to the mast, and expels air in the second space, at a portion in a vertical direction.

With this unique structure, the exhaust device expels the air in the second space at a portion in a vertical direction along the mast, and the air in the first space is drawn into the second space via a plurality of exhaust holes dispersed vertically along the mast. In other words, negative pressure in the second space generated by the exhaust device is even throughout the vertical direction along the mast, such that the air in the first space is drawn in evenly or substantially evenly throughout the vertical direction. Thus, airborne dust in the first space is efficiently captured with a single exhaust device throughout the entire wide range in the vertical direction. Thus, dust generated from the sliding section throughout the length of the mast is efficiently captured by a small number of exhaust devices.

The stacker claim may further include a second barrier that extends vertically and defines a third space and a fourth space by horizontally partitioning the first space. The exhaust device may include an intake port located nearer the third space than the fourth space, the plurality of exhaust holes may include a plurality of first exhaust holes that cause the third space and the second space to be in communication and a plurality of second exhaust holes that cause the fourth space and the second space to be in communication, and an airflow resistance of the plurality of first exhaust holes may be higher than an airflow resistance of the plurality of second exhaust holes.

With this unique structure, regardless of where the exhaust device is attached at the perimeter of the mast, airborne dust in the first space is able to be captured evenly and efficiently. Accordingly, the degree of freedom regarding attachment of the exhaust device to the stacker crane (i.e., the design freedom) increases.

Moreover, the exhaust device may be disposed between the mast and the shelf.

With this unique structure, the travel distance of the stacker crane within the limited installation area is able to be significantly increased or maximized.

Moreover, a guiding space that is in communication with the second space and an intake port of the exhaust device may be provided between the mast and the exhaust device.

With this unique structure, the performance ability of the exhaust device is effectively utilized.

Various preferred embodiments of the present invention provide a stacker crane that efficiently captures dust generated at, for example, the sliding section of the mast, throughout the entire vertical area of the mast, and does not contaminate, for example, a clean room with dust from the mast.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Next, stacker cranes according to preferred embodiments of the present invention will be described with reference to the Drawings. Note that the following preferred embodiments are merely examples of the stacker cranes according to the present invention. As such, the scope of the present invention is defined by the scope of the language in the appended claims, using the below preferred embodiments as references, and is not intended to be limited merely by the following preferred embodiments. Accordingly, among the elements in the following preferred embodiments, those not recited in any one of the independent claims defining the most generic aspects of the inventive concept are described as being used to achieve a preferred embodiment of the present invention, and are not absolutely necessary to overcome the problem described herein.

Figure 1:
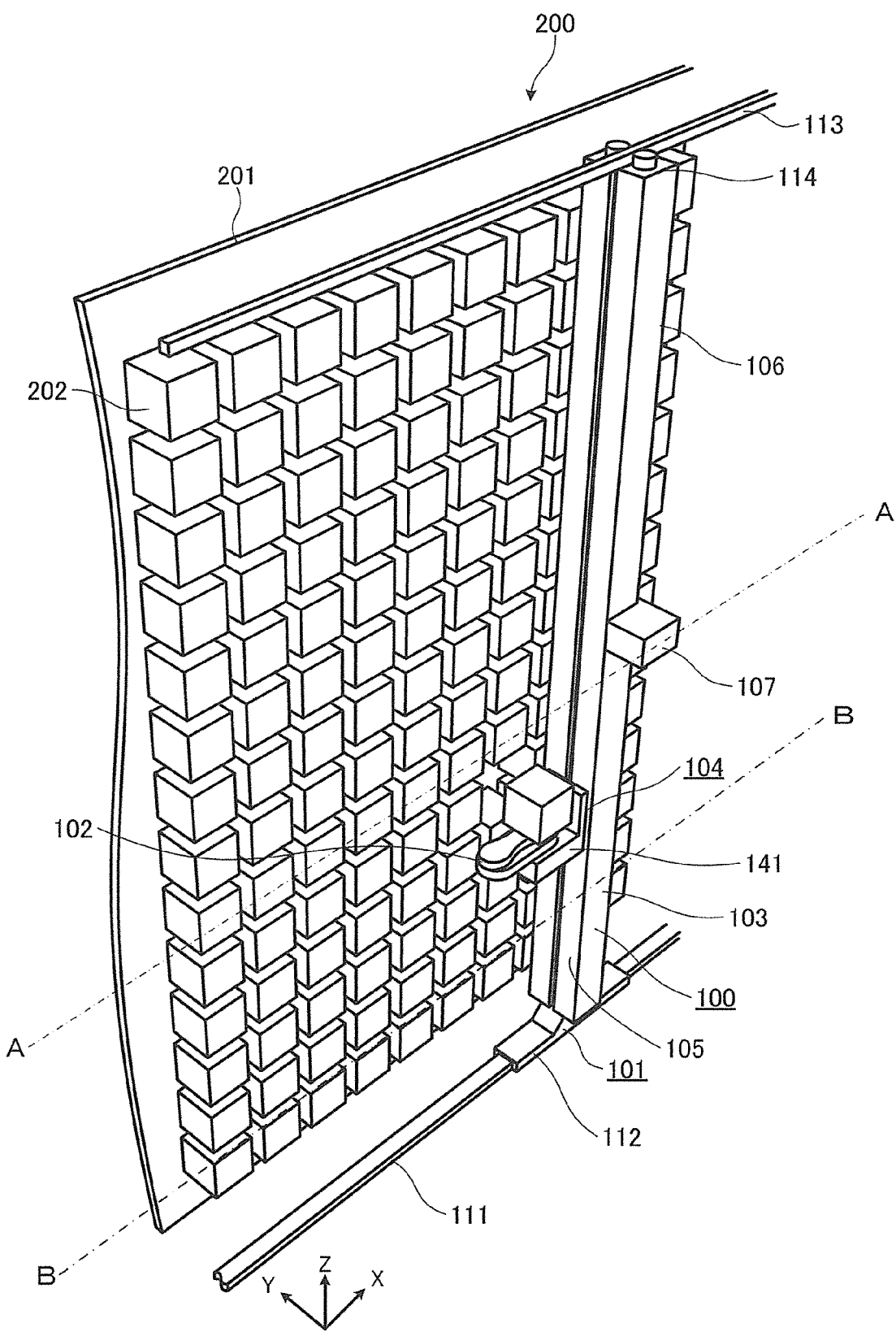
FIG. 1 is a partial view of an automated warehouse system including a stacker crane and shelves.

FIG. 1 is a partial view of an automated warehouse system including a stacker crane and shelves.

Figure 2:
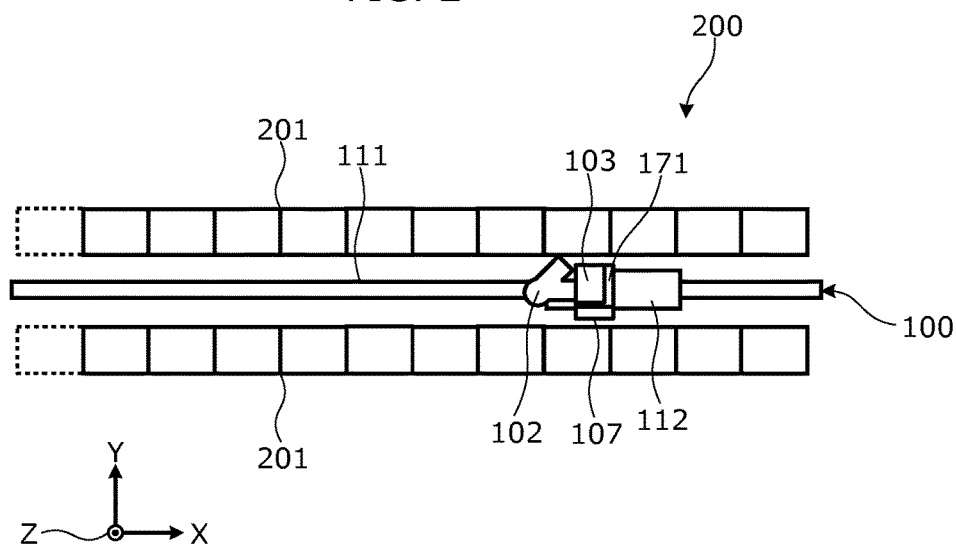
FIG. 2 is a plan view of an automated warehouse system from the top.

FIG. 2 is a plan view of an automated warehouse system from the top.

As illustrated in these figures, the automated warehouse system 200 includes two shelves 201 disposed parallel or substantially parallel to one another and a stacker crane 100 disposed between the two shelves 201. In this preferred embodiment, the automated warehouse system 200 preferably is a warehouse system used, for example, in a clean room, and places and stores the loads 202 on the shelves 201.

The shelves 201 align and store loads 202 in a vertical direction (along the Z axis in the Drawings) and in one horizontal direction (along the X axis in the figures), and allows for loads 202 to be individually placed and removed in another horizontal direction (along the Y axis in the Drawings).

In this preferred embodiment, the shelves 201 preferably include support bodies attached so as to protrude horizontally relative to pillars extending vertically, and the loads are placed on these support bodies.

The stacker crane 100 preferably is a crane including a travel unit 101 that moves along shelves 201 that store loads 202, a transfer unit 102 that transfers the loads 202 to the shelves 201, a mast 103 extending vertically and attached to the travel unit 101, and an ascending and descending unit 104 that slides along the mast 103 and moves the transfer unit 102 vertically, and also includes a first covering body 105, a second covering body 106, exhaust holes 136 (for example, see FIG. 3 and FIG. 4), and an exhaust device 107.

The stacker crane 100 is able to move the transfer unit 102 in front of any given load 202 stored on a shelf 201 by moving the travel unit 101 left and right (along the X axis in the Drawings) and moving the ascending and descending unit 104 vertically along the mast 103 (along the Z axis in the Drawings). In other words, the stacker crane 100 can remove any given load from a shelf 201 and place a load 202 in any given location on a shelf 201. More specifically, a controller automatically controls operation of the transfer unit 102.

The travel unit 101 preferably is a trolley that moves along the shelves 201 that store the loads 202, and causes the stacker crane 100 to travel horizontally (along the X axis in the Drawings). In this preferred embodiment, the travel unit 101 includes, for example, a motor, and also includes a lower trolley 112 that travels horizontally on a lower rail 111 on the floor of a room, and an upper trolley 114 that travels horizontally on an upper rail 113 disposed high in the room.

The transfer unit 102 is a device that transfers loads 202 between a shelf 201 and the stacker crane 100. In this preferred embodiment, the transfer unit 102 preferably uses SCARA technology to transfer loads 202 with a multi-jointed arm unit. The transfer unit 102 is able to transfer a load 202 between shelves 201 even in a narrow space by rotating the joints of the arm unit.

The ascending and descending unit 104 includes an ascending and descending platform 141 that is attached to the mast 103 in a manner that allows it to slide vertically along the mast 103 and has the transfer unit 102 attached thereto, an ascending and descending motor (not shown in the figures) to vertically drive the ascending and descending platform 141, and a transmission component 142 (see FIG. 3 and FIG. 4) such as a chain that transmits the driving power generated by the motor to the ascending and descending platform 141.

The mast 103 is a rod-shaped structural component which extends vertically (along the Z axis in the Drawings), and to which the travel unit 101 is attached. Following the movement of the travel unit 101, the mast 103 moves parallel or substantially parallel to a horizontal direction (parallel to the X axis in the Drawings). The mast 103 includes a sliding section 134 along which the ascending and descending platform 141 slides, and a sprocket (not shown in the figures), for example, is attached to the upper portion of the mast 103 and supports the transmission component 142.

Figure 3:
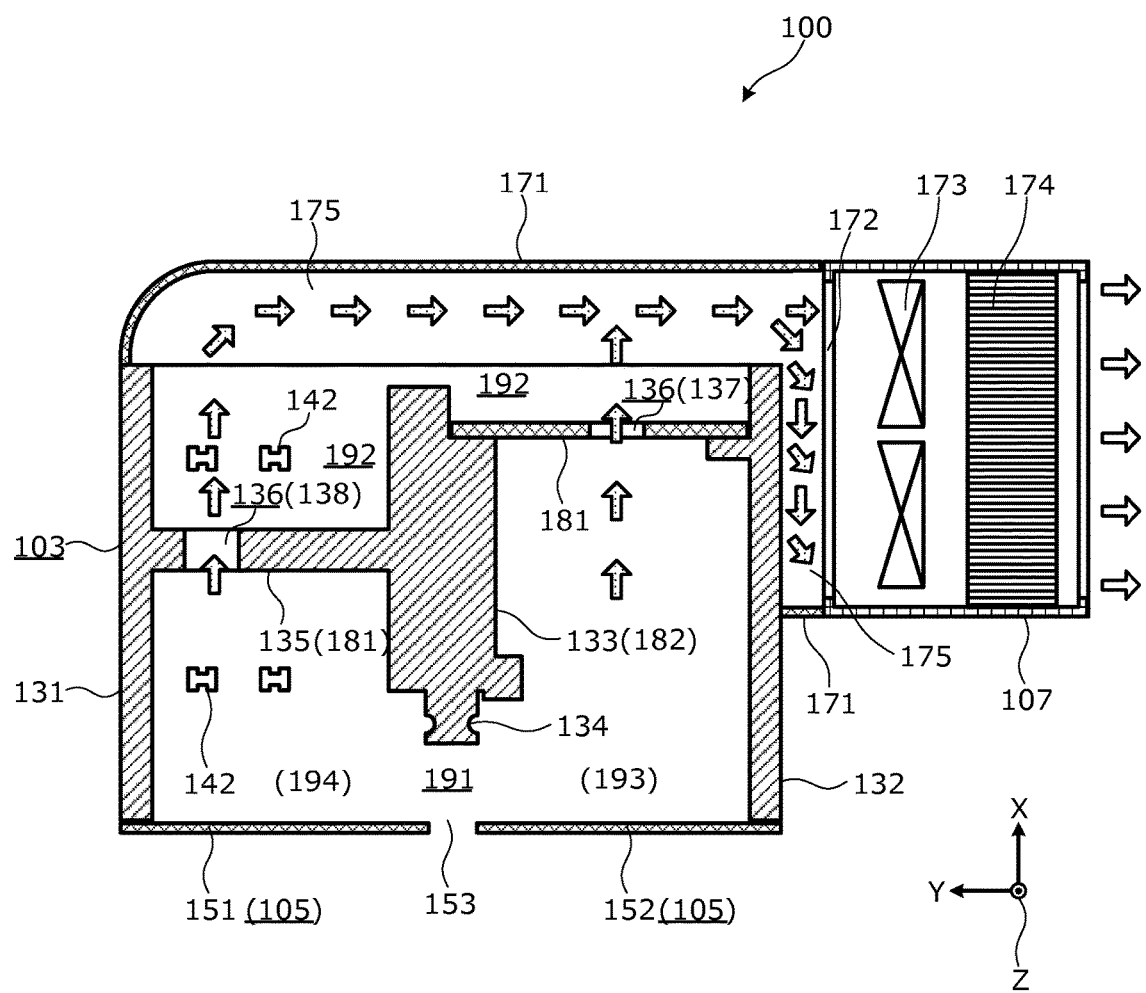
FIG. 3 is a cross sectional view of an imaginary cut made through the mast along line A-A in FIG. 1.

FIG. 3 is a cross sectional view of an imaginary cut made through the mast along line A-A in FIG. 1.

Figure 4:
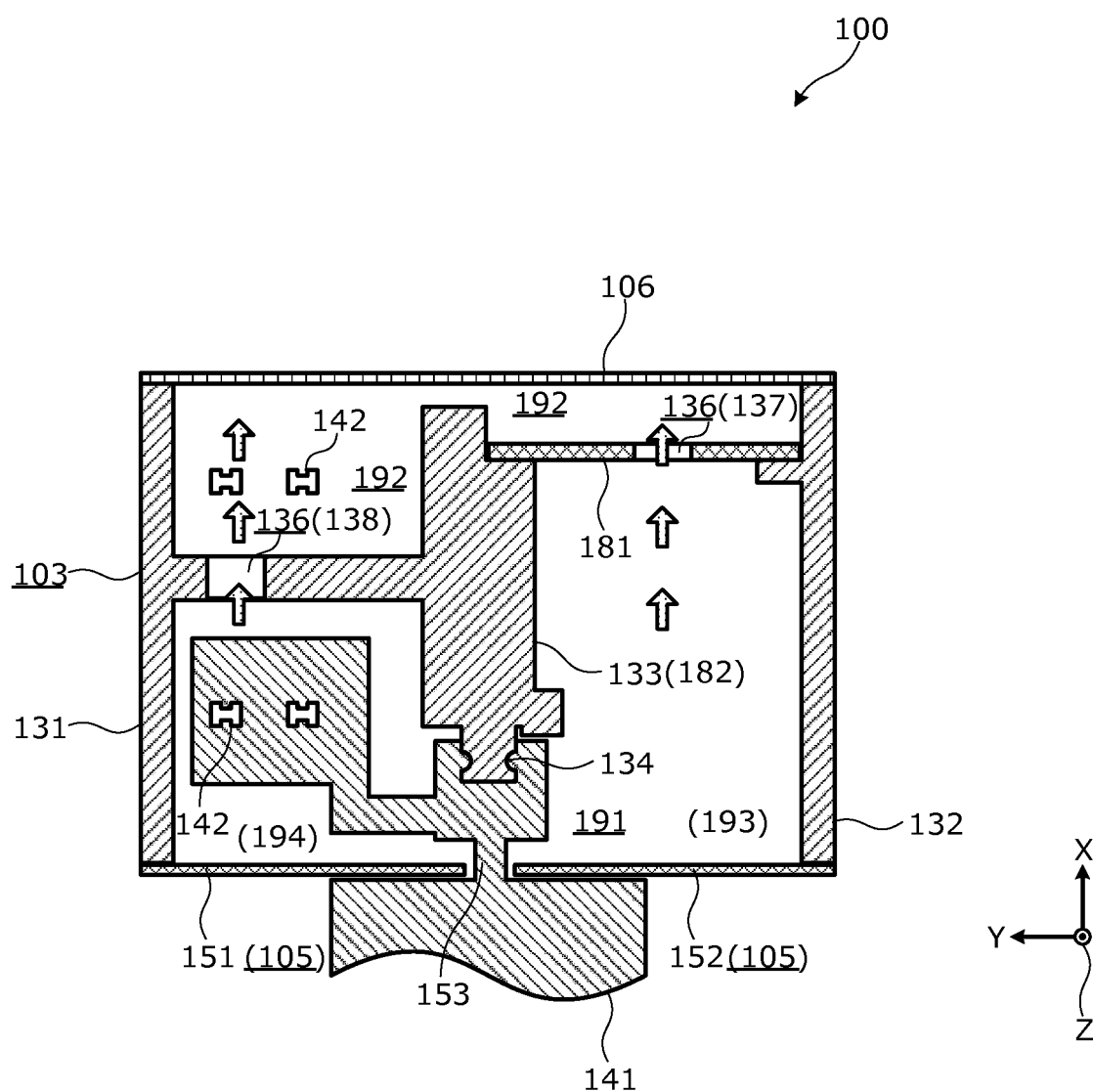
FIG. 4 is a cross sectional view of an imaginary cut made through the mast along line B-B in FIG. 1.

FIG. 4 is a cross sectional view of an imaginary cut made through the mast along line B-B in FIG. 1.

Figure 5:
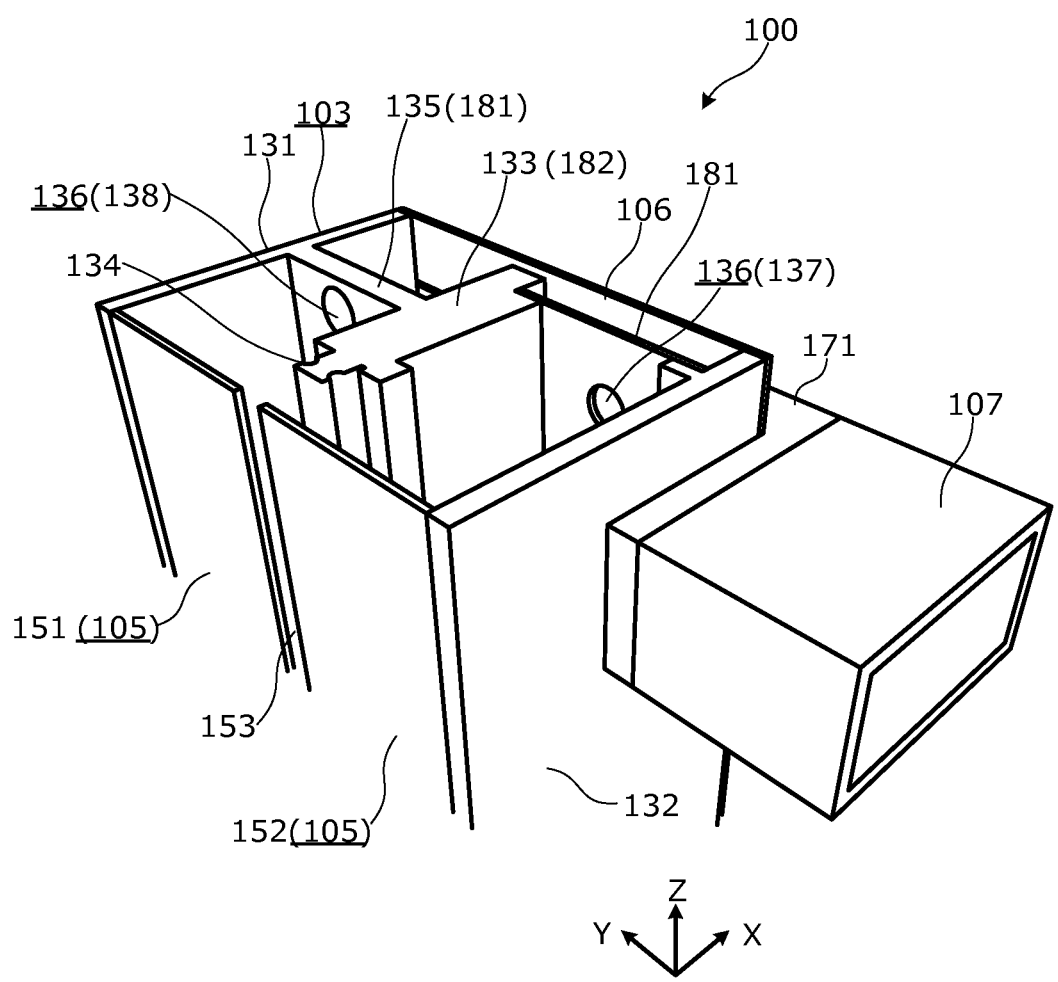
FIG. 5 is a perspective view from the negative direction of the X axis of the portion of the mast where the exhaust device is attached.

FIG. 5 is a perspective view from the negative direction of the X axis of the portion of the mast where the exhaust device is attached.

Figure 6:
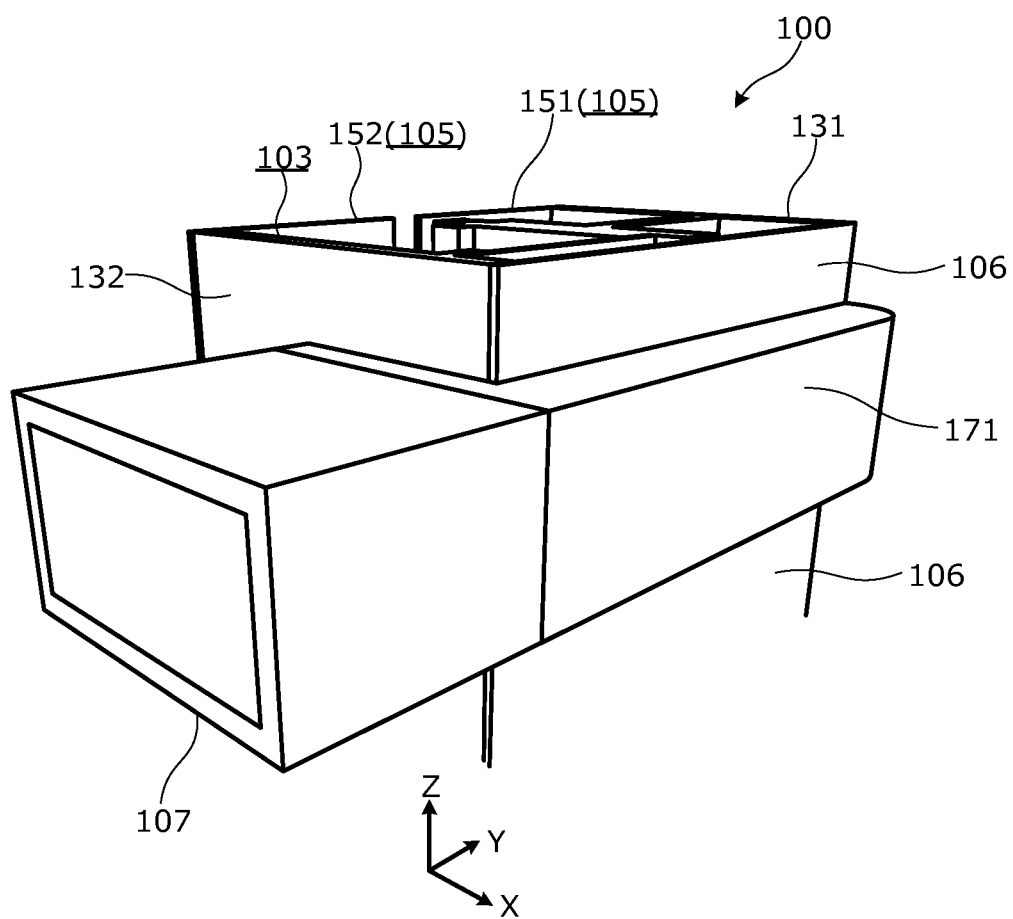
FIG. 6 is a perspective view from the positive direction of the X axis of the portion of the mast where the exhaust device is attached.

FIG. 6 is a perspective view from the positive direction of the X axis of the portion of the mast where the exhaust device is attached.

As illustrated in these figures, the mast 103 according to this preferred embodiment includes a rectangular or substantially rectangular, plate-shaped core section 133 elongated in the traveling direction of the stacker crane 100 (along the X axis in the Drawings) that is disposed in the central portion of the mast 103, a rectangular or substantially rectangular, plate-shaped first wall section 131 and a rectangular or substantially rectangular, plate-shaped second wall section 132 that are parallel or substantially parallel to the core section 133 and disposed so as to sandwich the core section 133, and a connecting section 135 that connects the first wall section 131 and the core section 133 in a bridge-like manner. Moreover, a first barrier 181 that connects the second wall section 132 and the core section 133 in a bridge-like manner is attached to the mast 103. Note that in addition to being a structural section of the mast 103, the connecting section 135 also defines and functions as the first barrier 181 that partitions the first space 191 and the second space 192.

Moreover, the end of the core section 133 in the traveling direction includes the sliding section 134. The first wall section 131 and the second wall section 132 of the mast 103 have wider traveling direction (X axis directions in the Drawings) widths than the core section 133, and the sliding section 134 is disposed in a region sandwiched by the first wall section 131 and the second wall section 132, fit into place.

Moreover, the first wall section 131, the core section 133, and the connecting section 135 define a sack-shaped section (e.g., a C-shaped or square C-shaped section). Moreover, no connection section corresponding to the connecting section 135 is present between the core section 133 and the second wall section 132.

Note that in FIG. 3 and FIG. 4, the first wall section 131, the second wall section 132, the core section 133, and the connecting section 135 of the mast 103, for example, preferably are illustrated as having a solid core, but the structure of the mast 103 is not particular limited, and may be formed of hollow components or a truss frame with thin plates attached thereto. Moreover, the cross sectional shape of the mast 103 is not particularly limited.

The first covering body 105 is a plate-shaped component that defines the first space 191 extending vertically along the mast 103, and covers the sliding section 134 of the mast 103 and the ascending and descending platform 141 of the ascending and descending unit 104.

In this preferred embodiment, the first covering body 105 is attached so as to provide a bridge between an end of the first wall section 131 in the traveling direction (the end in the negative direction of the X axis in the Drawings) and an end of the second wall section 132 in the traveling direction (the end in the negative direction of the X axis in the Drawings), and has a vertically extending slit 153 in a central portion for the ascending and descending platform 141 to pass through. More specifically, the first covering body 105 includes a left covering body 151 that extends from the first wall section 131 toward the core section 133, and a right covering body 152 that extends from the second wall section 132 toward the core section 133, and the gap between the left covering body 151 and the right covering body 152 is the slit 153. Here, "cover" does not only mean completely covering; the meaning as used here includes the presence of gaps (slit 153) or holes of a size that generate airflow resistance.

The first space 191 is a space surrounded by the mast 103, the first covering body 105, and the first barrier 181 (including the connecting section 135), and extends vertically in a long, pillar shape along the mast 103. Note that "space" does not mean a space that is completely closed off; the meaning as used here refers to a region enclosed by components to a degree that airflow resistance is generated when air travels from one space to another.

The second covering body 106 is a plate-shaped component that defines the second space 192 which is partitioned from the first space 191 by the first barrier 181 and extends vertically along the mast 103.

In this preferred embodiment, the second covering body 106 is attached so as to provide a bridge between an end of the first wall section 131 in the traveling direction (the end in the positive direction of the X axis in the Drawings) and an end of the second wall section 132 in the traveling direction (the end in the positive direction of the X axis in the Drawings), and extends vertically, as illustrated in FIG. 4 and FIG. 6. Moreover, the section of the second covering body 106 where a duct 171 that guides air to the exhaust device 107 is attached is opened so as to allow air to flow from the second space 192.

The second space 192 is a space surrounded by the mast 103 and the second covering body 106, and extends vertically in a long, pillar shape along the mast 103.

The air in the second space 192 is expelled by the exhaust device 107, and the second space 192 has a more negative air pressure than the first space 191 (including the third space 193 and the fourth space 194). Moreover, the air in the second space 192, which extends a long distance vertically, is expelled in a portion of the second space 192, but the second space 192 is designed such that the air throughout the vertical direction is capable of having an even negative pressure or substantially even negative pressure. Although the reason is not clear at this point in time, this is believed to be attributed to the fact that the second space 192 is smaller in volume than the first space 191 and negative air pressure generated by the exhaust device 107 expelling air is able to be caused to propagate rapidly in the vertical directions.

In this preferred embodiment, the transmission component 142 that transmits driving power to vertically drive the ascending and descending platform 141 of the ascending and descending unit 104 rotates through the second space 192.

Exhaust holes 136 are holes that are vertically dispersed in the first barrier 181 and place the first space 191 and the second space 192 in communication.

In this preferred embodiment, the first space 191 is partitioned into the third space 193 and the fourth space 194 by the core section 133 of the mast 103, which also defines and functions as the second barrier 182, and exhaust holes 136 which cause the second space 192 and the third space 193 to be in communication and exhaust holes 136 which cause the second space 192 and the fourth space 194 to be in communication are provided. Hereinafter, in order to distinguish between these exhaust holes 136, the exhaust holes 136 that are in communication with the third space 193 may be referred to as first exhaust holes 137, and the exhaust holes 136 that are in communication with the fourth space 194 may be referred to as second exhaust holes 138.

Moreover, in this preferred embodiment, the airflow resistance of the first exhaust holes 137 is set to be higher than the airflow resistance of the second exhaust holes 138. With this, the air in the third space 193 and the air in the fourth space 194 is able to be expelled evenly or substantially evenly, making it possible to evenly draw in dust. Note that the method of setting the difference in airflow resistances is not limited to a particular method; for example, the area of each opening of the first exhaust holes 137 is able to be set smaller than the area of each opening of the second exhaust holes 138, the total number of the first exhaust holes 137s is able to be set lower than the total number of the second exhaust holes 138, or the total area of the openings of the first exhaust holes 137 is able to be set to be smaller than the total area of the openings of the second exhaust holes 138. Moreover, the openings of the exhaust holes 136 disposed vertically (including the first exhaust holes 137 and the second exhaust holes 138) may have different size areas. More specifically, the area of the openings of the exhaust holes 136 near the exhaust device 107 may be set small, and the area of the openings of the exhaust holes 136 may be set so as to increase with distance from the exhaust device 107.

Here, the third space 193 is a space to the side near the intake port 172 of the exhaust device 107. Moreover, in this preferred embodiment, the third space 193 is a space through which electrical equipment, such as cables that receive control signals and supplying power to the transfer unit 102 attached with the ascending and descending unit 104, is routed, and as such, dust generated by, for example, cables rubbing against something, may become airborne.

The fourth space 194 is a space to the side farther from the intake port 172 of the exhaust device 107. In this preferred embodiment, the fourth space 194 is a space through which the transmission component 142 that transmits driving power to vertically drive the ascending and descending platform 141 of the ascending and descending unit 104 rotates through, and is a space in which dust may generate from the transmission component 142 such as a chain or from a sprocket, for example.

The exhaust device 107 is a device that is attached to the mast 103, and expels the air in the second space 192, at a portion of the second space 192 in the vertical direction.

In this preferred embodiment, the exhaust device 107 preferably is a fan filter unit which includes a fan 173 that draws in air and a filter 174 that removes dust from the drawn in air. Moreover, the exhaust device 107 is disposed between the mast 103 and a shelf 201, in other words, is attached to a side surface of the mast 103 relative to the traveling direction of the stacker crane 100, and a duct 171 is attached to the exhaust device 107 to guide the air in the second space 192 to the exhaust device 107.

The duct 171 is a component that defines a guiding space 175 that guides the air in the second space 192 to the exhaust device 107.

In this preferred embodiment, the exhaust device 107 is attached such that a portion of the intake port 172 protrudes from an end of the mast 103 in the traveling direction (the end in the positive direction of the X axis the Drawings) and another portion of the intake port 172 faces the mast 103. As a result, the duct 171 is shaped such that the guiding space 175 is also provided between the exhaust device 107 and the portion of the mast 103 that faces the exhaust device 107. In other words, the guiding space 175 defined by the duct 171 has a key shape (L shape) in a horizontal plane (in the XY plane in the Drawings). By providing the duct 171 with this sort of shape, even when the exhaust device 107 is attached to a side in a direction intersecting the direction in which the first space 191 and the second space 192 are aligned, loss of the expelling ability of the exhaust device 107 deriving from the position of the exhaust device 107 is able to be significantly reduced or kept to a minimum.

With the stacker crane 100 described above, the vertical length at which a single exhaust device 107 is able to evenly or substantially evenly draw in air in the first space 191 is able to be lengthened. Accordingly, even when the length of the mast 103 of the stacker crane 100 is increased, the number of exhaust devices 107 to be attached is able to be reduced, and airborne dust in the first space 191 is able to be efficiently captured with less energy. Thus, throughout the entire length of the mast 103, dust is able to be effectively prevented from escaping, making it possible to achieve a stacker crane 100 suitable for use in a clean room.

Note that the present invention is not limited to the above preferred embodiments. For example, preferred embodiments resulting from arbitrary combinations of constituent elements described in the present specification or preferred embodiments in which some constituent elements are left out may also be preferred embodiments of the present invention. The present invention also includes variations of the above preferred embodiments conceived by those skilled in the art unless they depart from the spirit and scope of the present invention, that is, the language in the claims.

For example, the automated warehouse system 200 is exemplified as preferably being used in a clean room, but may be used in, for example, a depository for temporarily storing various loads in a distribution warehouse.

Moreover, the transfer technique used by the transfer unit 102 is not limited to SCARA technology; for example, fork or push-pull techniques may be used.

Figure 7:
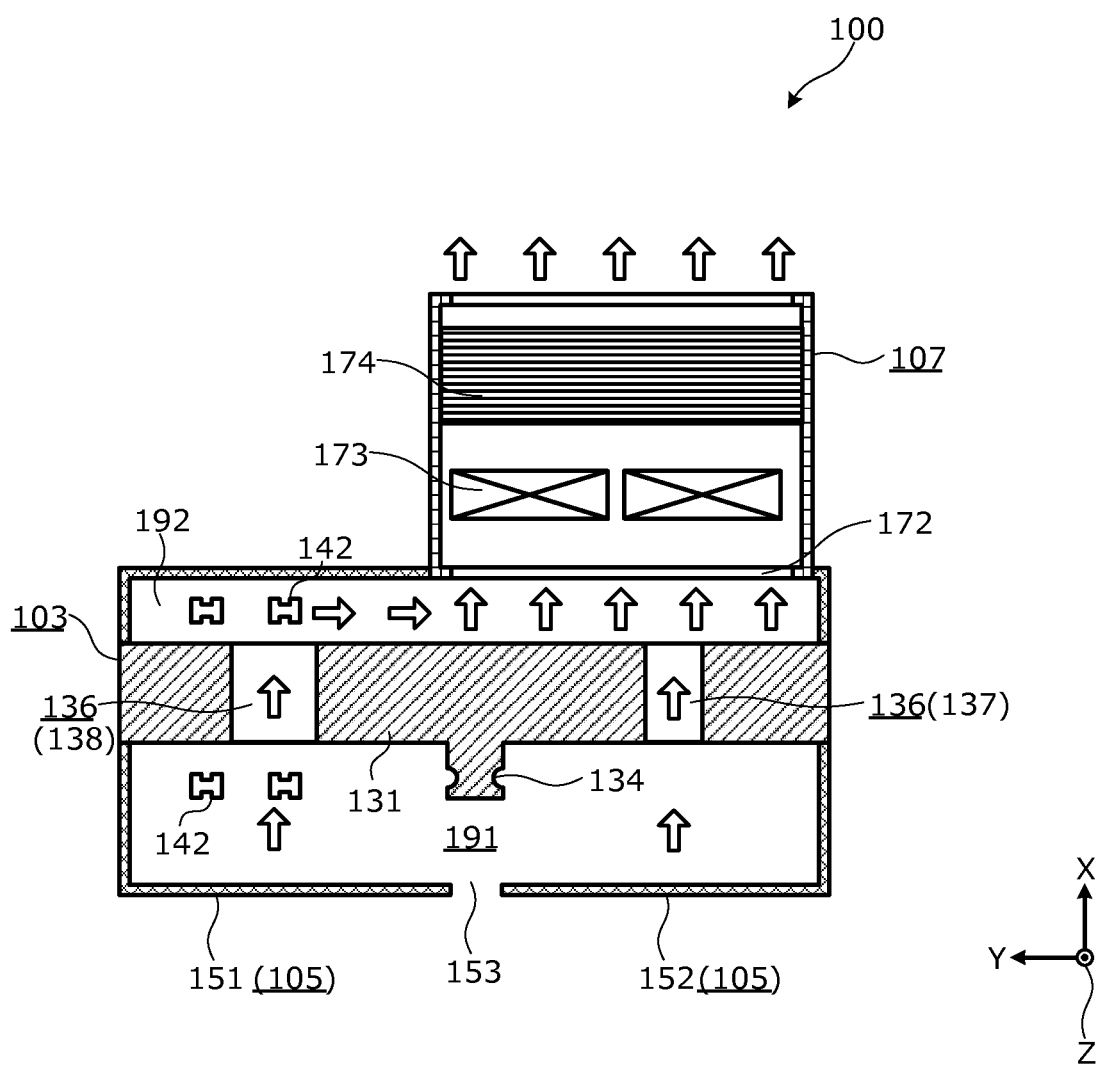
FIG. 7 is a cross sectional view of an imaginary cut made through a mast according to another preferred embodiment of the present invention along the XY plane.

Moreover, the shapes of the first covering body 105 and the second covering body 106 are not limited to flat plate shapes; for example, the first covering body 105 and the second covering body 106 may be bent as illustrated in FIG. 7, or curved.

Moreover, the exhaust device 107 may be attached on a side in the traveling direction (along the X axis in the Drawings). In this case, the airflow resistance of the first exhaust holes 137, which are, in this case, located relatively close to the intake port 172 of the exhaust device 107, may be set higher than the airflow resistance of the second exhaust holes 138, which are, in this case, located farther than the first exhaust holes 137.

Moreover, the exhaust device 107 is not limited to a fan filter unit; for example, the exhaust device 107 may include an exhaust fan and may expel the air from the exhaust fan out of the clean room via a duct.

Preferred embodiments of the present invention are applicable in, for example, automated warehouse systems installed in industrial establishments requiring a clean space.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stacker crane comprising:
a travel unit that moves along a shelf that stores a load;
a transfer unit that transfers the load to the shelf;
a mast extending vertically and attached to the travel unit;
an ascending and descending unit that slides along the mast and moves the transfer unit vertically;
a first covering body covering a sliding section of the mast and the ascending and descending unit, and providing a first space extending vertically along the mast;
a second covering body providing a second space extending vertically along the mast, the second space being partitioned from the first space by a first barrier;
a plurality of exhaust holes that are vertically dispersed in the first barrier and cause the first space and the second space to be in communication;
an exhaust device that is attached to the mast and expels air in the second space; and
a second barrier that extends vertically and provides a third space and a fourth space by horizontally partitioning the first space; wherein
the exhaust device includes an intake port located closer to the third space than the fourth space;
the plurality of exhaust holes include a plurality of first exhaust holes that cause the third space and the second space to be in communication, and a plurality of second exhaust holes that cause the fourth space and the second space to be in communication; and
an airflow resistance of the plurality of first exhaust holes is higher than an airflow resistance of the plurality of second exhaust holes.

2. The stacker crane according to claim 1, wherein an area of each opening of the plurality of first exhaust holes is smaller than an area of each opening of the plurality of second exhaust holes.

3. The stacker crane according to claim 1, wherein a total number of the plurality of first exhaust holes is less than a total number of the plurality of second exhaust holes.

4. The stacker crane according to claim 1, wherein a total area of openings of the plurality of first exhaust holes is smaller than a total area of openings of the plurality of second exhaust holes.

5. The stacker crane according to claim 1, wherein the exhaust device is located between the mast and the shelf.

6. The stacker crane according to claim 5, wherein a guiding space is located between the mast and the exhaust device, the guiding space being in communication with the second space and an intake port of the exhaust device.

\* \* \* \* \*